April 12, 1932. J. C. P. HARRIS 1,853,610
CRANK SHAFT FOR LOOMS
Filed July 23, 1931 2 Sheets-Sheet 1

INVENTOR:
J. C. P. Harris
BY
ATTORNEY.

April 12, 1932.　　J. C. P. HARRIS　　1,853,610
CRANK SHAFT FOR LOOMS
Filed July 23, 1931　　2 Sheets-Sheet 2

INVENTOR:
J. C. P. Harris
BY
ATTORNEY.

Patented Apr. 12, 1932

1,853,610

UNITED STATES PATENT OFFICE

JAMES C. P. HARRIS, OF KANNAPOLIS, NORTH CAROLINA

CRANK SHAFT FOR LOOMS

Application filed July 23, 1931. Serial No. 552,778.

This invention relates to a crank shaft for looms and the like and means for attaching a driving means thereto.

Heretofore, various attempts have been made to provide suitable driving means for a crank shaft for looms and due to the great amount of vibration in such structures, many of these attempts have resulted in failure on account of the vibration causing the attaching means for the power driven means to work loose and therefore, to not serve the purpose for which they were designed.

It is an object of this invention to provide a crank shaft for looms having integral therewith a disk or an enlargement to which driving means are adapted to be removably secured so that said driving means can be easily removed from the loom as occasion requires without the necessity of removing the crank shaft from the loom.

In the preferred embodiment of the invention as shown in the drawings, I provide a crank shaft having a disk thereon which may be integral with the crank shaft, machined therefrom, or placed thereon by contraction or any other suitable means to cause the crank shaft and the disk to act as an integral structure.

Some of the objects of the invention having been stated, other objects will appear as the description proceeds when taken in connection with the accompanying drawings, in which—

Figures 1, 2, 3:
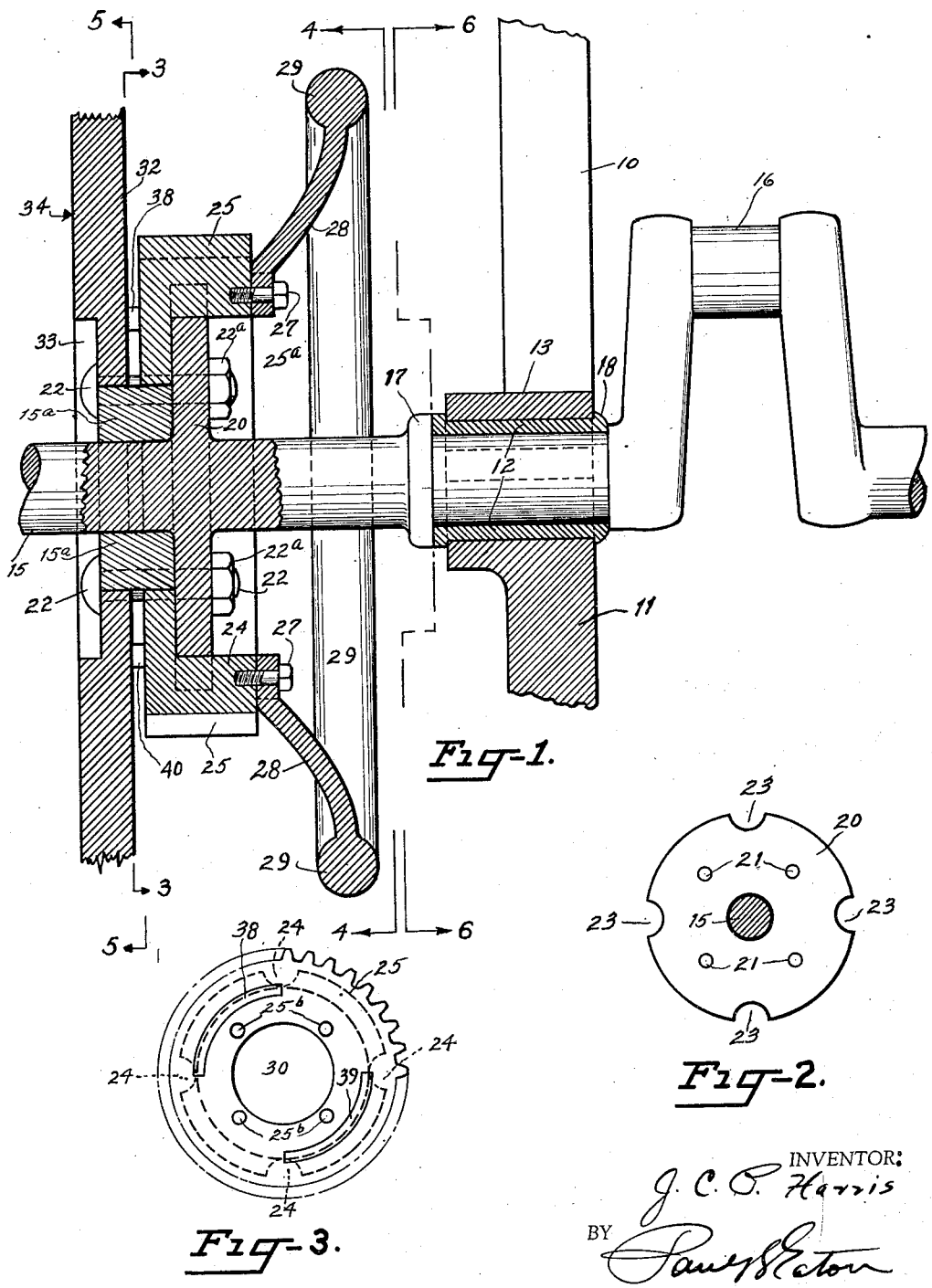
Figure 1 is a longitudinal sectional view showing my crank shaft and means for attaching the driving means thereto.
Figure 2 is a side elevation of the disk and showing the crank shaft in cross section.
Figure 3 is an elevation of the gear taken along the line 3—3 in Figure 1, with shaft omitted.
Figure 4:
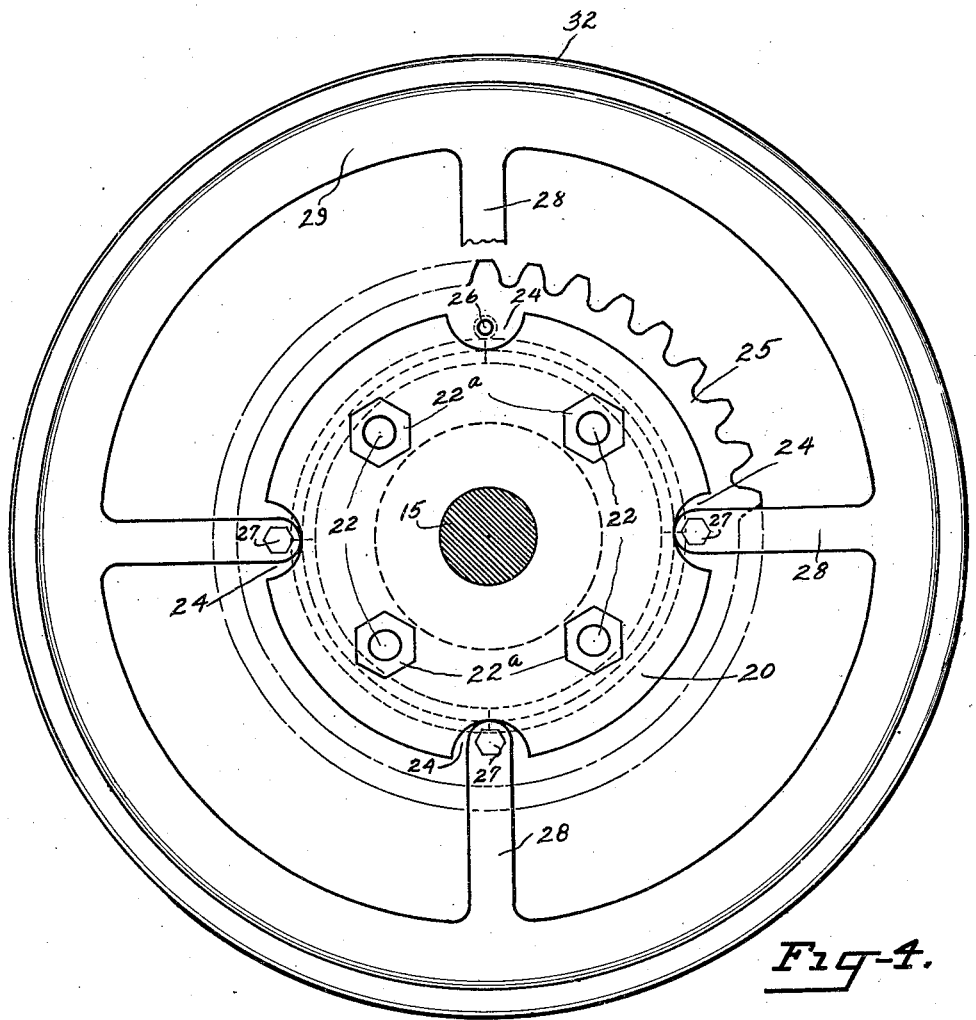
Figure 4 is a view taken along the line 4—4 in Figure 1.
Figure 5:
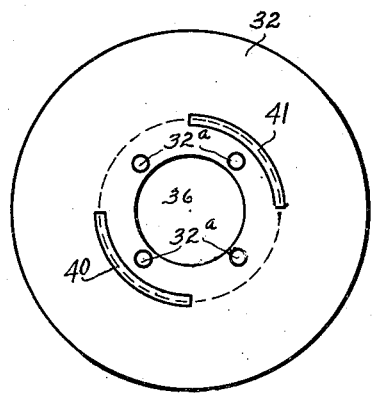
Figure 5 is a view taken along the line 5—5 in Figure 1 with shaft omitted.
Figure 6:
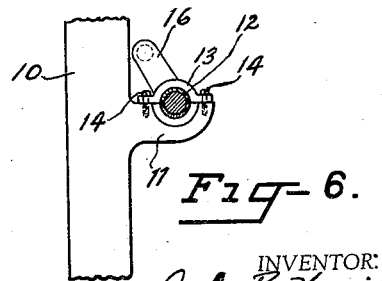
Figure 6 is a view taken along the line 6—6 in Figure 1, and showing the manner in which the crank shaft and bearings therefor may be installed in a loom frame.

Referring more specifically to the drawings, the numeral 10 indicates a portion of the loom frame having a projection 11 thereon in which a split bearing 12 is adapted to rest with said bearing being secured in position by means of a cap 13 secured by means of bolts 14, said bearing being adapted to receive a portion of crank shaft 15 said crank shaft having a plurality of crank portions 16 thereon (only one crank being shown). The crank shaft which I provide has an enlarged portion 17 to fit against one end of the split bearing 12, and another enlarged portion 18 to fit against the other end of the bearing, for receiving the crank shaft.

The crank shaft extends outwardly from the loom and has either integral therewith or secured suitably thereon in a permanent manner, a disk 20 which disk has a plurality of holes 21 therein thru which bolts 22 may be passed for securing the parts together as will be hereinafter explained. This disk has a plurality of cavities 23 in the periphery thereof, said cavities being adapted to receive projections 24 on gear wheel 25 with said projections having holes 26 therein for the reception of stud bolts 27 which also penetrate the spokes 28 of hand wheel 29 for securing the hand wheel to the gear wheel 25.

The gear wheel 25 has a hole 30 therein for reception of portion 15a on shaft 15 in such a manner as to have a sliding fit with said shaft. A driving member 32 is adapted to be secured to gear wheel 25 and disk 20 by means of bolts 22 passing thru driving member 32 and also passing thru gear wheel 25 and thru disk 20 for securing all of the parts together.

The driving member 32 has the circular cavity 33 therein for the reception of the heads of bolts 22 so that in case the driving member is a friction drive with a friction face 34 these bolts will be removed from contact with the friction driving means pressing against the face 34. The member 34 may also be a pulley if desired as this mechanism is capable of use either with a pulley driving mechanism or with a friction driving mechanism to suit various types of looms.

The driving member 34 likewise has a hole 36 in the center thereof to cause it to have a sliding fit over portion 15a on shaft 15.

On the left hand face of gear wheel 25 as viewed in Figure 1 are the arcuate projections 38 and 39 and the driving member 32 likewise has arcuate projections 40 and 41 to fit between the arcuate projections 38 and 39 to prevent turning movement between gear 25 and driving member 34. Gear wheel 25 has holes 25b therein for reception of bolts 22.

The bolts 22 have nuts 22a thereon which are disposed within cavity 25a of gear 25.

In securing driving means to my improved crank shaft, it is evident that gear wheel 25 will be slipped over disk 20 with the projections 24 passing into the cavities 23 in disk 20 and the driving member 32 will be placed in the position shown in Figure 1, and then the bolts 22 will be passed thru holes 32a in driving member 32 and then thru holes 21 in disk 20, and the nuts 22a will be secured thereon to bind all of the parts firmly together and hand wheel 29 can be secured in position by means of stud bolts 27 and the structure is ready for operation.

The portion 15a is shown contracted on shaft 15 but it is evident this may be integral with shaft 15.

In the drawings and specification there has been set forth a preferred embodiment of my invention and although specific terms are employed, they are used in a generic and descriptive sense only and not for purposes of limitation, the scope of the invention being set forth in the appended claims.

Claims:

1. An improved crank shaft for looms and the like comprising a disk fixedly secured on said crank shaft and having a plurality of cavities in the periphery thereof, a gear wheel having a circular cavity in the face thereof and being adapted to fit over said disk, a driving member and means for securing the driving member, the gear wheel and said disk together.

2. A crank shaft for looms and driving means therefor comprising a crank shaft having a disk integral therewith, said disk having cavities in the periphery thereof, a gear wheel having a circular cavity in the face thereof, projections on the gear wheel extending into the cavity in the gear wheel and being adapted to fit into the cavities in the disk, a driving member adapted to be secured to the gear wheel, and a plurality of bolts passing thru the driving member, the gear wheel, and said disk for securing the parts together.

3. An improved crank shaft and driving means therefor, comprising a disk on said crank shaft, said disk having a plurality of cavities in the periphery thereof, a gear wheel having a circular cavity in one side thereof with said gear wheel having projections extending into said cavity in the gear wheel, the projections being adapted to fit within the cavities in the disk, a driving member adapted to fit against the gear wheel, means for securing the driving member, the gear wheel and said disk together.

In testimony whereof I affix my signature.
JAMES C. P. HARRIS.